US007259718B2

United States Patent
Patterson et al.

(10) Patent No.: US 7,259,718 B2
(45) Date of Patent: Aug. 21, 2007

(54) APPARATUS AND METHOD FOR KEEPING PETS IN A DEFINED BOUNDARY HAVING EXCLUSION AREAS

(75) Inventors: Wade C. Patterson, Huntsville, AL (US); Thomas J. Watson, Madison, AL (US); Terry Phillips, Meridianville, AL (US); M. Bennet Perritt, Madison, AL (US)

(73) Assignee: Rocket City Technology, Inc., Huntsville, AL (US)

( * ) Notice: Subject to any disclaimer, the term of this patent is extended or adjusted under 35 U.S.C. 154(b) by 0 days.

(21) Appl. No.: 10/390,881

(22) Filed: Mar. 19, 2003

(65) Prior Publication Data

US 2003/0179140 A1 Sep. 25, 2003

Related U.S. Application Data

(60) Provisional application No. 60/365,448, filed on Mar. 19, 2002.

(51) Int. Cl.
*G01S 3/02* (2006.01)

(52) U.S. Cl. ...................................................... 342/463

(58) Field of Classification Search .................. 342/463, 342/464, 465
See application file for complete search history.

(56) References Cited

U.S. PATENT DOCUMENTS

| | | | |
|---|---|---|---|
| 5,121,711 A | 6/1992 | Aine | |
| 5,207,178 A | 5/1993 | McDade et al. | |
| 5,241,923 A | 9/1993 | Janning | |
| 5,868,100 A | 2/1999 | Marsh | |
| 5,933,079 A | * 8/1999 | Frink | .......................... 340/539 |
| 5,982,291 A | 11/1999 | Williams et al. | |
| 6,236,358 B1 | 5/2001 | Durst et al. | |

* cited by examiner

*Primary Examiner*—Bernarr E. Gregory
*Assistant Examiner*—Fred H. Mull
(74) *Attorney, Agent, or Firm*—Blank Rome LLP

(57) ABSTRACT

An electronic pet fence is provided having several stationary transceivers and a mobile collar transceiver attached to the pet. Boundary and keep out locations are determined during a learning mode and stored in memory. Determination logic responds to signals exchanged between the stationary transceivers and the collar transceiver during an operation mode to determine if the pet is located within the defined boundary.

7 Claims, 5 Drawing Sheets

US 7,259,718 B2

APPARATUS AND METHOD FOR KEEPING PETS IN A DEFINED BOUNDARY HAVING EXCLUSION AREAS

This application claims priority of provisional application Ser. No. 60/365,448 Filed Mar.19, 2002

FIELD OF THE INVENTION

The present invention relates, in general, to providing an electronic fence for keeping animals within a defined boundary by electronically determining the location of the animals with respect to the defined boundary.

BACKGROUND OF THE INVENTION

Pet owners desiring to keep their pets within a defined boundary are considering alternatives to traditional fences. Currently, there are several electronic fences or boundaries that serve as alternatives. One such alternative is a buried wire fence, and another is a distributed transponder fence as described in U.S. Pat. No. 5,241,923. There are several electronic fences or boundary control systems that require no buried wires or transponders. The fenceless animal control system described in U.S. Pat. No 5,868,100 determines animal location using GPS satellites and a reference ground station for improved accuracy.

SUMMARY OF THE INVENTION

In view of the limitations of prior art electronic fences, the present invention is directed to a wireless fence or containment system made up of stationary transceivers and a collar with a mobile transceiver.

In a preferred embodiment, a system for determining the location of a pet within a boundary is made up of a plurality of transceivers located at fixed locations and having location determination logic in one or more of the fixed transceivers. Further, the system has a mobile transceiver in a pet collar for responding to the signals from each of the plurality of fixed transceivers. When the pet is located in an area that is out of bounds or within an exclusion area, an audible sound or an electric shock is used in an effort to control the pet's location and to cause the pet to stay in bounds.

BRIEF DESCRIPTION OF THE DRAWINGS

The invention will be best understood when reading the detailed description in conjunction with the accompanying drawings, wherein.

DESCRIPTION OF THE PREFERRED EMBODIMENT

Typical electronic fence or boundary control systems often utilize an electronic fence made up of buried wires or encoders that interact with a transceiver on a collar that is worn by a pet. For a conventional wireless system having buried elements, it is necessary to insert encoders at a spacing of several feet or to dig a trench and bury wires. If the boundary for the pet is to be changed, then it is usually necessary to locate and dig up the buried wires or encoders. Although a Global Positioning Satellite (GPS) fence system, which uses the satellites for location information, eliminates the burying and digging up deficiency, it is still necessary to have at least two transceivers on the ground.

Figure 1:
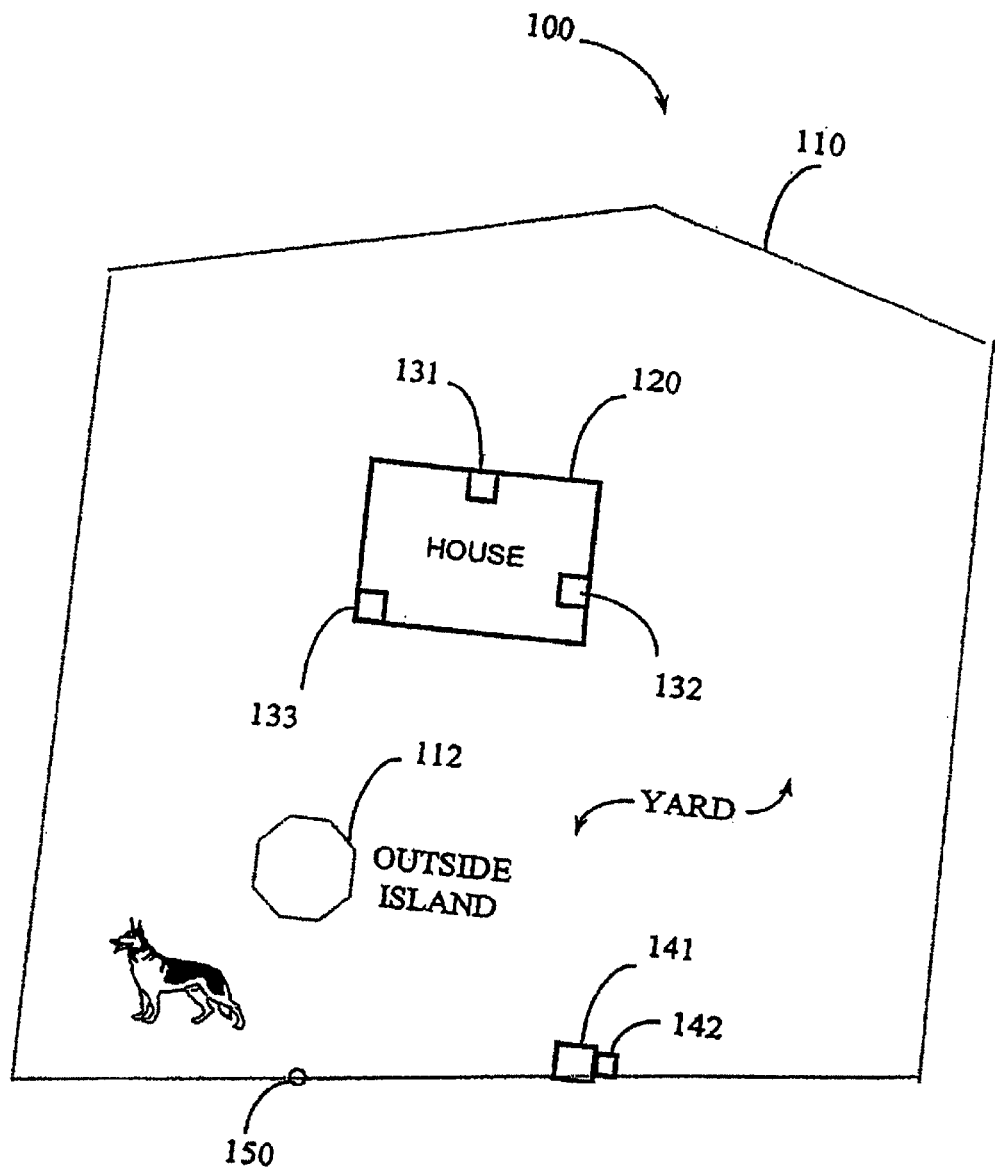
FIG. 1 is a block diagram of an embodiment of the present invention.

Referring now to FIG. 1, a wireless fence system 100 is illustrated having an environment for and elements in accordance with a preferred embodiment of the present invention. The system 100 is utilized to keep a pet, such as a dog, in a boundary 110 about a house 120. The system 100 preferably has three transceivers 131, 132, 133 located in the house and arranged in a triangular configuration. The transceivers inside the house may be mounted on the walls or may be located at other convenient locations. Note that in other embodiments, one or more of the transceivers may be located in areas outside of the house. In the preferred embodiment, the transceivers are anchored and are not moved once the system 100 is operational. If the transceivers are moved after the system 100 is operational it may be desirable to repeat the system training or learning sequence, which will be described in more detail hereafter.

A collar 141, having a mobile collar transceiver 142, is worn by a pet that is to be contained within the boundary 110. However, before the collar is placed on the pet, a system installer operates the mobile transceiver 142 in a learning mode comprising a boundary mode and an optional island or exclusion area mode. The boundary mode is part of the installation or setup of the system 100. When operating in the boundary mode, boundary information is generated and stored in system memory. The boundary information indicates the approximate locations of the boundaries 110, 112, 122.

Figure 2:
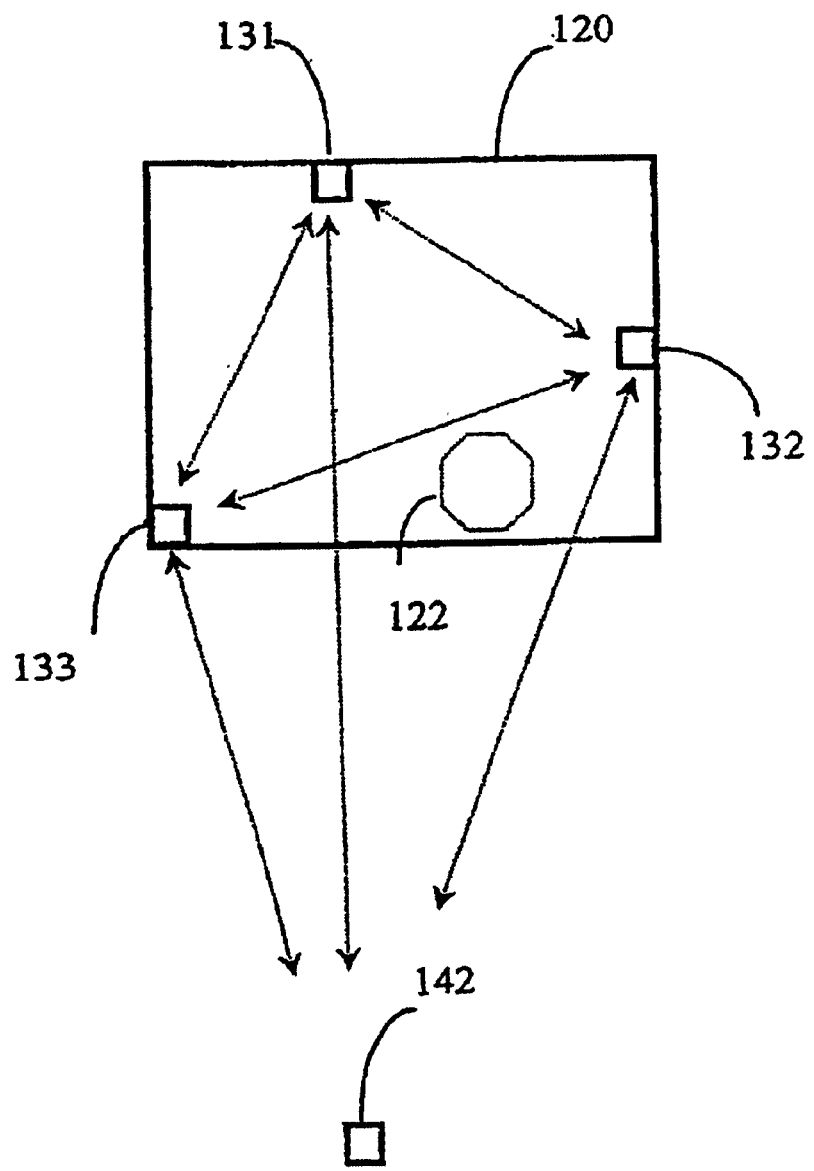
FIG. 2 is a block diagram illustrating details of the embodiment of the present invention as shown in FIG. 1.

Referring now to FIG. 2, the transceivers 131, 132, 133 are shown located within the house 120. An inside island 122 within the house is a keep out or exclusion area for keeping pets away from items such as a pieces of furniture, rugs, etc. In the preferred embodiment, one transceiver such as transceiver 131, is a main transceiver acting as a master transceiver in a master/slave arrangement. The main transceiver 131 serves as a scheduler and timer for activities in the other transceivers 132, 133 as will be described hereafter. In addition, the main transceiver 131 stores boundary and island data, generates pet location information, and stores other system information. Each of the transceivers 131, 132, 133 may receive power from an electrical outlet in the house. In other embodiments, separate power supplies, backup supplies or both may be used. Each of the transceivers 132, 133 has an identity or identifier that is stored in the main transceiver 131. When the transceivers 132, 133 are turned on, the main transceiver 131 establishes communication with the other transceivers 132, 133 using a communication protocol. Once transceivers 131, 132, 133 have been turned on and initialized, the system 100 is ready to operate in the boundary mode. Next, the battery powered collar transceiver 142 is turned on and put in the boundary mode.

When the collar transceiver 142 is in the boundary mode, a boundary is established by moving (carried by a system installer) the collar transceiver 142 around the desired boundary. As the collar transceiver 142 is moved around the desired boundary, the collar's distance from each of the transceivers 131, 132, 133 is periodically recorded or sampled. For example, if the collar 141 is located at position 150 on the boundary 110 of the yard, travel times for radio signals between the collar transceiver 142 and each of the transceivers 131, 132, 133 is measured. For each sample, travel time measurements are taken between the collar transceiver 142 and each of the three transceivers 131, 132, 133 in the house, and the three time measurements are stored in memory of the main transceiver 131. Once the desired boundary 110 has been traversed and boundary information is stored, the collar transceiver 142 is optionally placed in an island mode.

The island mode is similar to the boundary mode except that a traversed area is treated as a keep out or exclusion area during the operational mode, which will be described hereafter. In this regard, the system installer preferably moves the collar 141 along the boundaries 112, 122 of each island that is to be established by the system 100. While the collar 141 is being moved along the boundaries 112, 122, travel time measurements between the collar transceiver 142 and the transceivers 131, 132, 133 in the house are periodically sampled and stored in the memory of the main transceiver 131, as described above for boundary 110. Upon traversing each desired island and storing island boundary information, the system 100 is placed in an operational mode.

When the transceivers 131, 132, 133 and collar transceiver 142 are in the operational mode, the system installer may test the system functionality. For example, the installer carrying the collar 141 may move within any of the boundaries to see if corrective actions are activated on the collar when appropriate. For example if the collar gets within a minimum distance, such as 5 feet from an established boundary 110, 112, 122 an alarm sound is preferably provided by an electrical speaker on the collar 141. If the installer crosses the boundary line, an indication is preferably given that electrical probes on the collar are active. Once the installer is confident that the system is operational, the collar 141 may be placed on the pet and the electronic fence is functional.

The corrective actions embedded in the collar for providing an adverse stimulus to the pet may be similar to those currently used to train animals, such as providing brief shocks to the pet or making warning sounds. In addition, the present invention has an optional feature that includes voice commands in the collar 141—which may be commands placed in a memory device by a manufacturer or may be a recording of commands or phrases uttered by the pet owner. The voice commands may be transmitted from the main transceiver 131 or may be actuated by the main transceiver 131 and played from stored messages in the collar 141. The main transceiver 131, in the preferred embodiment has alarms and messages, such as maintenance requirements displayed on a panel of the main transceiver 131. Alternate notification methods are also contemplated to be within the scope of the invention.

Figure 3:
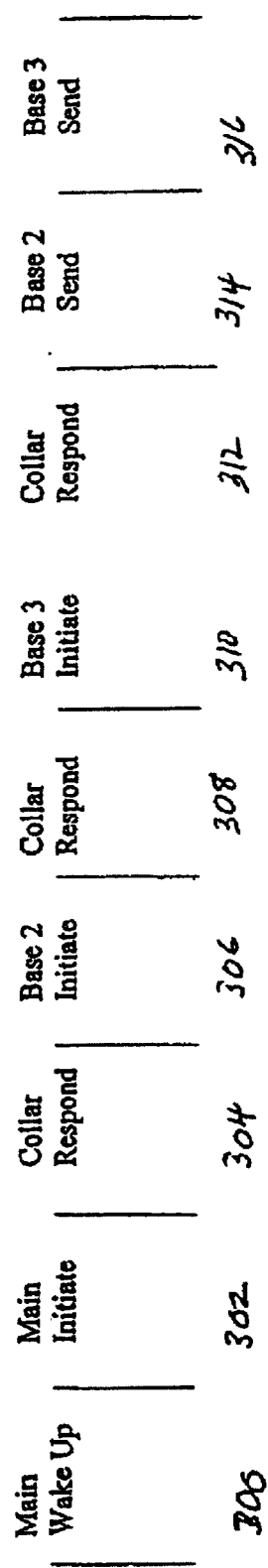
FIG. 3 is a time line of the sequence of events implemented via the system shown in FIG. 1.

FIG. 3 illustrates the sequence of steps taken to determine the location of a pet wearing the collar 141 during the operational mode of the system 100. The main transceiver 131 starts the steps at wake up time, indicated by reference numeral 300. Next, the main transceiver 131 initiates a round trip time measurement by transmitting a signal to the collar, indicated by reference numeral 302. The collar transceiver 142 receives the transmission from the main transceiver 131 and responds by returning a signal, indicated by reference numeral 304. The main transceiver 131 then stores the round trip time in memory. Next, a second transceiver, such as transceiver 132, initiates a round trip time measurement by transmitting a signal, as indicated by reference numeral 306. Again, the collar transceiver 142 responds by returning a signal and the round trip time between the second transceiver 131 and the collar 141 is determined, as indicated by reference numeral 308. Finally a third transceiver, such as transceiver 133, initiates a round trip time measurement by transmitting a signal, as indicated by reference numeral 310. Again the collar transceiver 142 responds by returning a signal and the round trip time between the third transceiver 133 and the collar transceiver 142 is determined, as indicated by reference numeral 312. The second transceiver 132 sends to the main transceiver 131 the measured round trip time between the second transceiver 132 and the collar transceiver 142, as indicated by reference numeral 314, and then the third transceiver 133 sends to the main transceiver 131 the measured round trip time from the collar transceiver 142 to the third transceiver 133, as indicated by reference numeral 316. The three round trip times are processed by a logic device in the main transceiver 131 using triangulation to determine the location of the collar 141 with respect to the established boundaries 110, 112, 122. If the pet wearing the collar 141 is in or close to areas that are not allowed (e.g., close to or outside of the perimeter defined by boundary 110, or close to or within the perimeters defined by boundaries 112, 122), the pet is warned either audibly or by receiving a shock.

Figure 4:
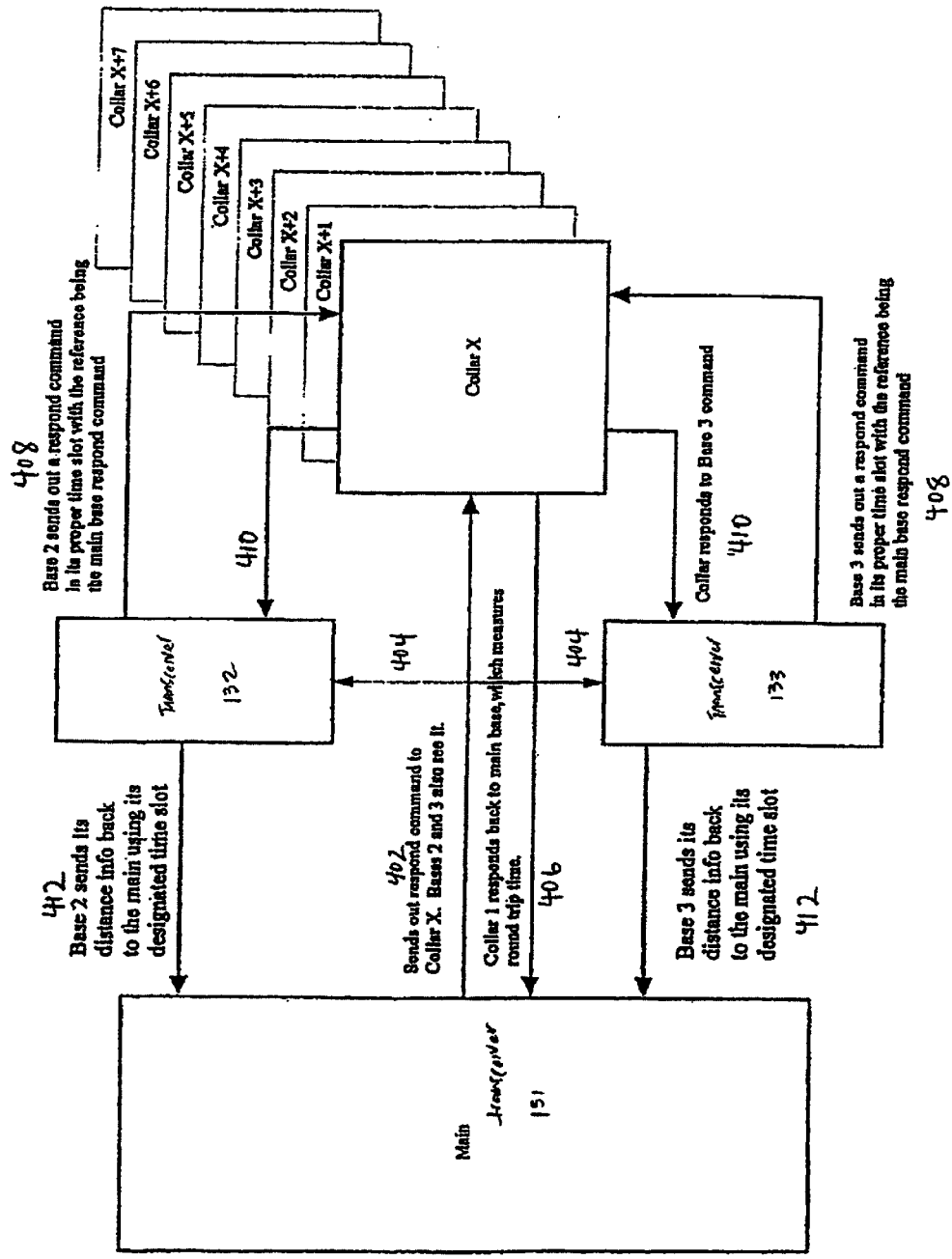
FIG. 4 is a flow chart showing the elements of the time line of FIG. 3.

FIG. 4 is a block diagram showing the general flow of information described in FIG. 3. FIG. 4 shows that more than one collar 141 may be used in the system for controlling more than one pet and that different boundaries may be established for different collars and, therefore, for different pets. The process works by sending out a first respond command signal from the main transceiver 131, which is received by the collar X, as indicated by reference numeral 402, and the other transceivers, in this case, transceivers 132, 133, as indicated by reference numeral 404. The signal is received by collar X, which then sends out a return signal, as indicated by reference numeral 406, to the main transceiver 131, which records the round trip time. The transceivers 132, 133 after receiving the first respond command sends a signal to the collar X, as indicated by reference numeral 408 and receives a response, indicated by reference numeral 410, to determine the round trip time of the signals. The transceivers 132, 133 then send this information back to the main transceiver 131, as indicated by reference numeral 412, which uses it to calculate the position of the collar. All the signals initiated by the first respond command sent out by the main transceiver 131 are associated or referenced with the first respond command so that related response times can be compared. If more than one collar exists, this process can be repeated as indicated by collars X+1 thru X+7.

Figure 5:
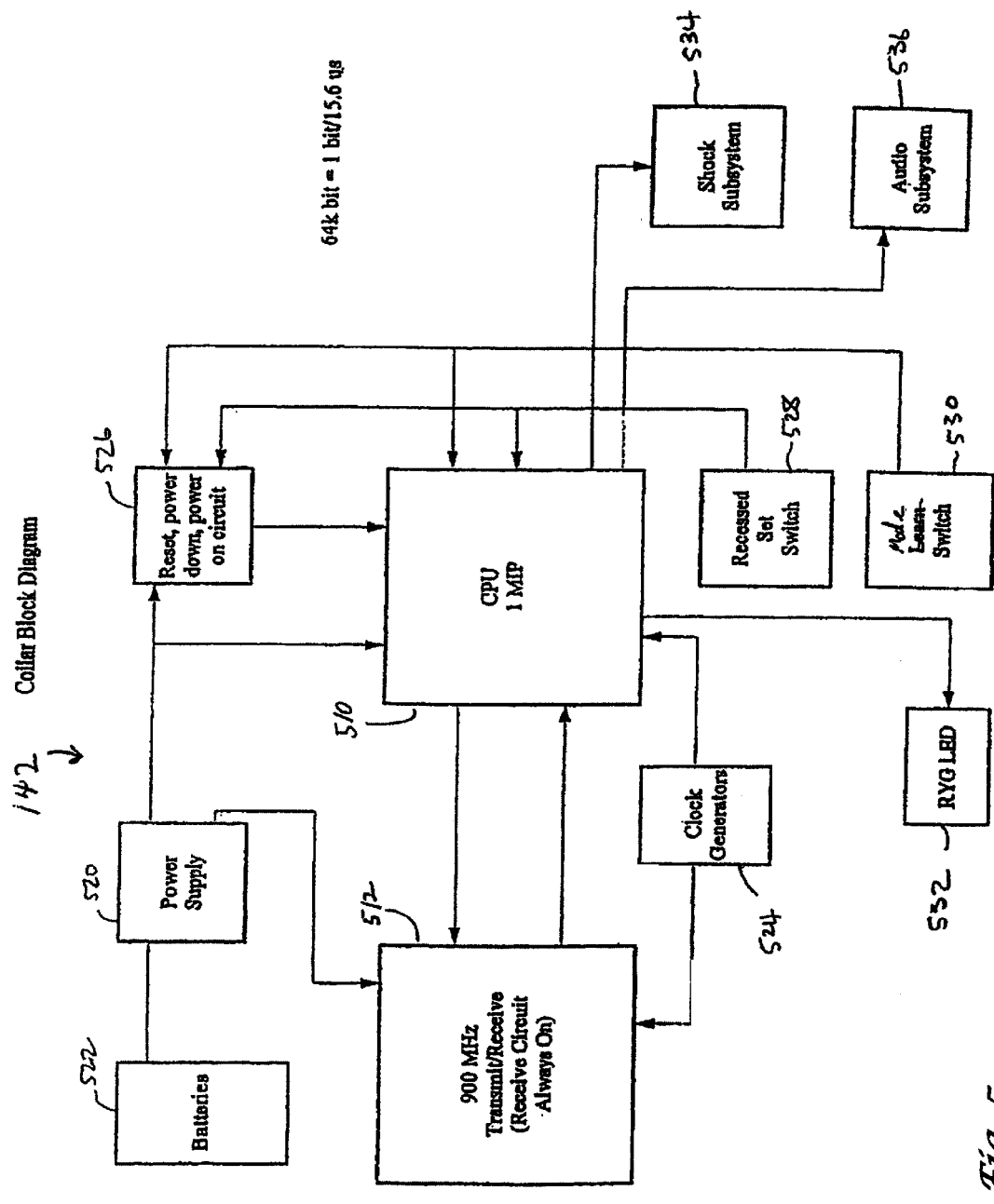
FIG. 5 is block diagram of a collar transceiver for an embodiment of the present invention.

FIG. 5 is a block diagram of the collar transceiver 142, including a central processing unit (CPU) 510 and a transmit/receive unit 512. A power supply 520, which in the preferred embodiment is shown as batteries 522, supplies power to the components in the collar transceiver 142. The CPU 510 controls the various functions in the collar transceiver 142, including communicating with the transmit/receive unit 512 and clock generator 524 to determine the location of the collar transceiver 142. A power switch 526 having a recessed set switch 528 is connected to the CPU 510 to turn the collar on and off. Additionally, a mode switch 530 is provided that changes the collar between its various modes, i.e. it's operational mode and it's learning mode (the boundary and island modes). The collar transceiver also includes an LED which can display a red, yellow or green light to indicate how close the pet is to a boundary, and a shock subsystem 534 and an audio subsystem 536 for alerting a pet owner to a pet's crossing a boundary.

The main transceiver 131, the second transceiver 132, and the third transceiver 133 each have a communication device, a logic unit, and timing circuits. The logic and timing circuits may be implemented in a variety of arrangements of digital components including a processor, a programmed gate array, an ASIC, discrete logic elements, and/or other known or future developed signal processing components.

The main transceiver 131 also includes memory for storing location and boundary information and includes a processing algorithm for determining the collar location with respect to the established boundaries. Though not required for the system 100 to function, maintenance and other information is gathered by and stored in the main transceiver 131 that displays such information automatically or upon request. The main transceiver 131, in another embodiment, has a communication port for viewing information from a PDA, personal computer or other device.

The present invention comprising a plurality of stationary transceivers can be implemented without the use of a master/slave arrangement. There are protocols used in LAN systems that could be adapted to provide for shared time slots for distance measurements and communications. Those skilled in the art could make such modifications and provide a system that is in the scope of the present invention.

The above-described embodiments of the present invention, particularly, any "preferred" embodiments, are merely possible examples of implementations set forth for a clear understanding of the principles of the invention. It will be observed that numerous variations and modifications may be effected without departing from the spirit and scope of the novel concept of the invention. All such modifications and variations are intended to be included herein within the scope of this disclosure and the present invention.

What is claimed is:

1. A programmable system for determining the location of a mobile object within a predetermined boundary, the system comprising:

a plurality of stationary transceivers and a mobile transceiver to be coupled to a moving object, the stationary transceivers and the mobile transceiver being able to communicate with one another;

the transceivers including a learning mode and an operational mode, the learning mode including moving the mobile transceiver along a boundary line while the mobile transceiver is in communication with the stationary transceivers so as to define a boundary in relation to the stationary transceivers, and the operational mode comprising determining the location of the mobile transceiver in relation to the defined boundary;

the learning mode including a boundary mode and an island mode, the boundary mode being used to define an outer boundary so that in the operational mode the mobile transceiver is prevented from moving out of the area defined by the outer boundary, and the island mode being used to define an inner boundary so that in the operational mode the mobile transceiver is prevented from moving inside the area defined by the inner boundary.

2. The programmable system for determining the location of an object within a predetermined boundary of claim 1, wherein:

the location of the mobile transceiver in relation to the statutory transceivers are measured by the amount of time a signal takes to travel between the stationary transceivers and the mobile transceiver.

3. The programmable system for determining the location of an object within a predetermined boundary of claim 2, wherein:

one of the stationary transceivers is a main transceiver having a processing and storage device, the storage device storing the boundary information acquired during the learning mode and the processing device comparing the travel time of the signal between each of the stationary transceivers and the mobile transceiver to determine the location of the mobile transceiver.

4. The programmable system for determining the location of an object within a predetermined boundary of claim 3, wherein:

a signal is produced when the mobile transceiver is moved outside the outer boundary or inside the inner boundary.

5. The programmable system for determining the location of an object within a predetermined boundary of claim 4, wherein:

the mobile transceiver adapted to be placed onto an animal for confining the animal to allowed areas.

6. A programmable system for determining the location of an object within a predetermined boundary, the system comprising:

a mobile transceiver adapted to be coupled to a pet to confine the pet to predetermined boundaries and at least three stationary transceivers, the stationary transceivers and the mobile transceiver being in wireless communication with one another, one of the stationary transceivers being a main transceiver having a processing and storage device, the storage storing the boundary information and the processing device comparing the travel time of a signal between each of the stationary transceivers and the mobile transceiver to determine the location of the mobile transceiver;

the transceivers including a learning mode and an operational mode, the learning mode including moving the mobile transceiver along a boundary line while the mobile transceiver is in communication with the stationary transceivers so as to define a boundary in relation to the stationary transceivers, and the operational mode comprising determining the location of the mobile transceiver in relation to the defined boundary;

the learning mode including a boundary mode and an island mode, the boundary mode being used to define an outer boundary so that in the operational mode the mobile transceiver is prevented from moving out of the area defined by the outer boundary, and the island mode being used to define an inner boundary so that in the operational mode the mobile transceiver is prevented from moving inside the area defined by the inner boundary; and the boundary is defined in the learning mode by measuring the amount of time a signal takes to travel between the stationary transceivers and the mobile transceiver.

7. The programmable system for determining the location of an object within a predetermined boundary of claim 6, wherein:

the mobile transceiver includes a central processing unit attached to a clock generator for determining the round trip time for the signals between the mobile transceiver and the stationary transceivers, a display device for displaying mobile transceiver information, a switch to alternate the mobile transceiver between its learning mode and operational mode, an audio system to provide an audible alarm to the pet, and a shock system that discomforts the pet.

* * * * *